E. T. CROAN.
BAND CUTTER AND FEEDER.
APPLICATION FILED AUG. 21, 1914.

1,131,334.

Patented Mar. 9, 1915.

Witnesses
Fenton S. Belt
J. W. Sherwood

Inventor
Ernest T. Croan,
By Franklin H. Hough
Attorney

THE NORRIS PETERS CO., PHOTO-LITHO., WASHINGTON, D. C.

UNITED STATES PATENT OFFICE.

ERNEST T. CROAN, OF MOUND CITY, KANSAS, ASSIGNOR OF ONE-HALF TO THOMAS J. CROAN, OF MOUND CITY, KANSAS.

BAND-CUTTER AND FEEDER.

1,131,334.      Specification of Letters Patent.      Patented Mar. 9, 1915.

Application filed August 21, 1914. Serial No. 857,942.

*To all whom it may concern:*

Be it known that I, ERNEST T. CROAN, a citizen of the United States, residing at Mound City, in the county of Linn and State of Kansas, have invented certain new and useful Improvements in Band-Cutters and Feeders; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in apparatus in band cutters and feeders and consists in mechanism whereby the quantity of grain being fed will automatically regulate the feeding thereof at different speeds.

Figure 1:
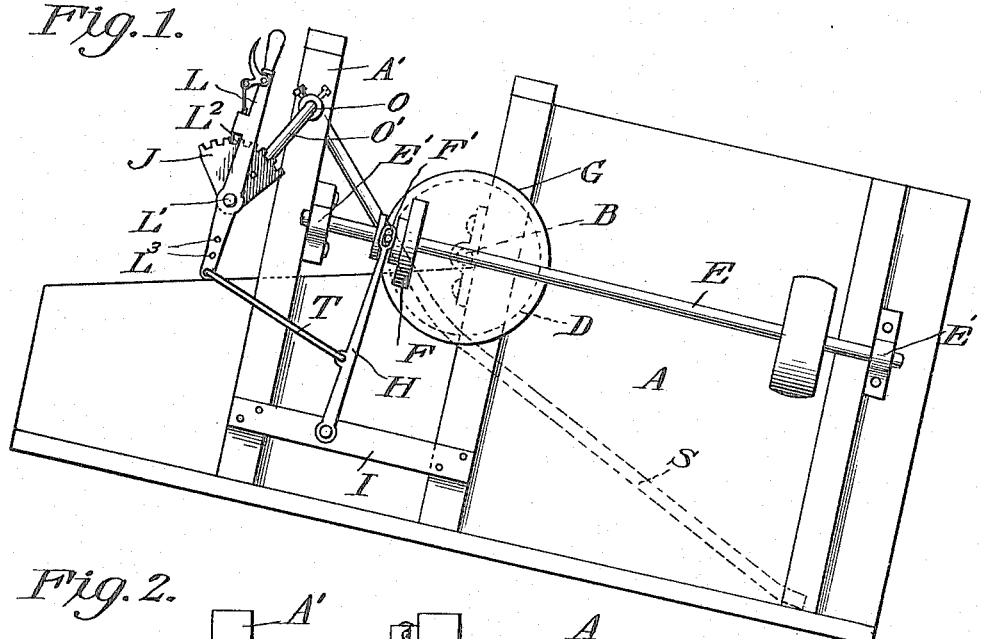
Figure 2:
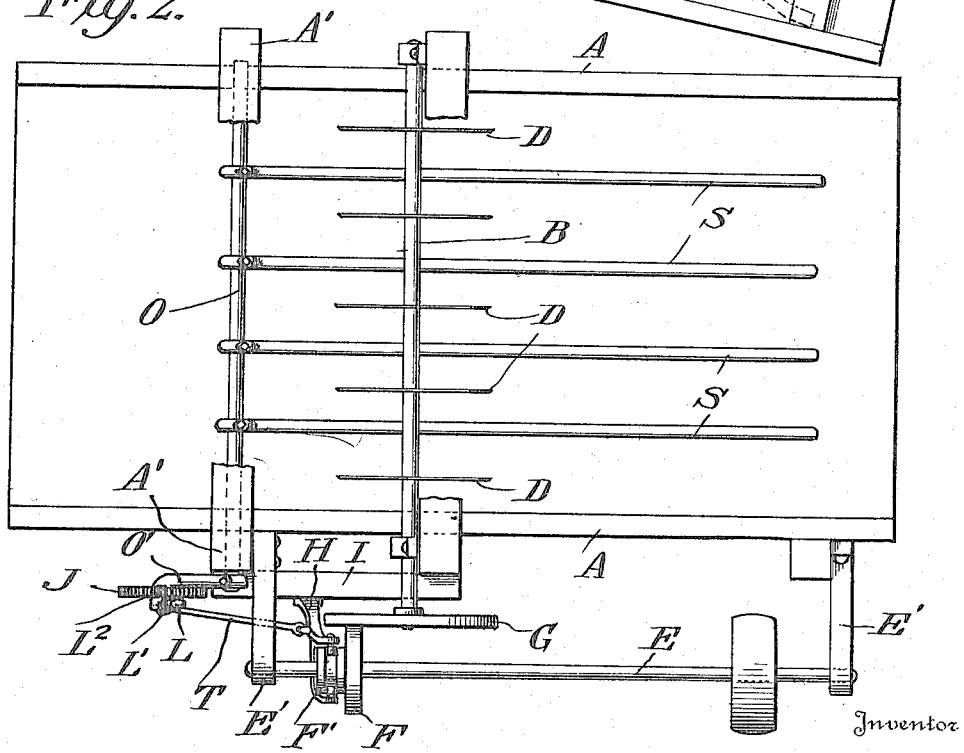

My invention is illustrated in the accompanying drawings, in which:

Figure 1 is a side elevation of the apparatus, and Fig. 2 is a top plan view.

Reference now being had to the details of the drawings by letter, A designates the frame of the feeder of a threshing machine and in the walls of which is suitably journaled a feed shaft B, having circular cutting disks D thereon positioned at intervals. A friction disk G is fixed to the end of said shaft B, and E designates a shaft journaled in bearings E' upon the side of the frame. A friction disk F is splined to said shaft E and a rod H is pivotally mounted upon a bar I secured to the side of the frame and has swivel connection with a pin in groove F' in the hub portion of the disk F. The two disks are adapted to frictionally contact with each other and, when the disk F is shifted toward or away from the center of the disk G, the speed imparted to the disk G will be lessened or accelerated accordingly.

A rock shaft, designated by letter O, is journaled in standards A' upon the sides of the feeder frame and one end is bent at right angles to form a crank O' to which a curved notched segment J is fixed.

L designates a lever which is pivotally mounted upon the end L' of the crank and a pawl L² mounted upon a lever is adapted to hold the lever in different adjusted positions relative to the segment, accordingly as it may be desired to cause the shaft B to rotate at different speeds when the rock shaft is adjusted to different positions.

A bar T is pivotally connected to the rod H at one end and its other end is adjustably connected in one or another of the apertures L³ in the lever L. Curved fingers, designated by letter S, are fastened to the rock shaft and are positioned underneath the feed shaft and are provided for the purpose of regulating the quantity of grain allowed to be fed into the machine.

The operation of the apparatus will be readily understood. In the event of large bundles of grain or grain in considerable quantity being fed into the apparatus underneath the bars S, the latter will be caused to be raised accordingly and the shaft O will rock and cause the disk F, through its connections with said shaft, to move toward the center of the friction wheel G, thus causing the feed of the machine to accelerate, whereas, when small bundles or a less quantity of grain is fed underneath the bars S, the latter will fall accordingly and cause the shaft to rock in the opposite direction, thereby throwing the splined friction wheel F farther from the center of the disk G and thereby slacken the speed. By this automatic apparatus, a steady and uniform feeding of the grain through the apparatus is afforded. Through the medium of the lever L, the speed of the apparatus may be changed at will.

By the provision of an apparatus embodying the features of my invention, it will be noted that a simple and efficient feeding means is provided whereby the quantity of grain being fed may be regulated relative to varying speeds imparted to the cutting or feeding knives which cut into the grain and feed it forward from underneath the finger.

What I claim to be new is:

A band cutting and feeding apparatus, comprising a frame, a feeding shaft journaled therein, cutting blades fixed to the shaft, a friction disk fixed to said shaft, a counter shaft, a friction disk splined thereto, the two disks coöperating to regulate the speed of the feeding shaft, a rock shaft journaled in the frame, fingers fixed thereto and projecting intermediate and below said blades, a crank upon said rock shaft, a segment fixed to said crank and having a projecting portion which is perforated, adjustable pivotal rod connections between the perforated portion of the segment and the friction disk upon the driving shaft, a lever pivoted upon a laterally extending end of the crank, and a pawl carried by the lever and engaging the teeth of the segment, as set forth.

In testimony whereof I hereunto affix my signature in presence of two witnesses.

ERNEST T. CROAN.

Witnesses:
A. L. COLE,
RALPH W. MOODY.

Copies of this patent may be obtained for five cents each, by addressing the "Commissioner of Patents, Washington, D. C."